(12) United States Patent
Scarf

(10) Patent No.: US 8,317,224 B2
(45) Date of Patent: Nov. 27, 2012

(54) VEHICLE OCCUPANT HEAD PROTECTION

(76) Inventor: Richard Gale Scarf, Narrabeen (AU)

( * ) Notice: Subject to any disclaimer, the term of this patent is extended or adjusted under 35 U.S.C. 154(b) by 0 days.

(21) Appl. No.: 12/682,946

(22) PCT Filed: Sep. 22, 2008

(86) PCT No.: PCT/AU2008/001408
§ 371 (c)(1),
(2), (4) Date: Apr. 14, 2010

(87) PCT Pub. No.: WO2009/036522
PCT Pub. Date: Mar. 26, 2009

(65) Prior Publication Data
US 2010/0244420 A1 Sep. 30, 2010

(30) Foreign Application Priority Data
Sep. 20, 2007 (AU) .................................. 2007905125

(51) Int. Cl.
*B60N 2/427* (2006.01)
*B60R 21/02* (2006.01)
*B60R 22/00* (2006.01)

(52) U.S. Cl. .................... 280/749; 280/753; 280/801.1; 297/216.12

(58) Field of Classification Search .................. 280/749, 280/751, 753, 801.1, 801.2, 804, 808; 297/216.12, 297/391, 408, 483
See application file for complete search history.

(56) References Cited

U.S. PATENT DOCUMENTS

| | | | |
|---|---|---|---|
| 3,722,951 A * | 3/1973 | Ezquerra | 297/488 |
| 4,664,341 A * | 5/1987 | Cummings | 244/122 AG |
| 6,199,947 B1 * | 3/2001 | Wiklund | 297/216.12 |
| 6,290,299 B1 * | 9/2001 | Frisch et al. | 297/410 |
| 6,619,751 B1 * | 9/2003 | Shah | 297/464 |
| 2001/0002087 A1 * | 5/2001 | Townsend | 280/801.1 |

FOREIGN PATENT DOCUMENTS

WO    WO 9519899 A1 *  7/1995
* cited by examiner

*Primary Examiner* — Joseph Rocca
(74) *Attorney, Agent, or Firm* — Galbreath Law Offices, P.C.; John A. Galbreath

(57) ABSTRACT

A head restraint device (10) provides sideways restraint for a vehicle occupant's head (41) with restraint members (28) The restraint members (28) are movable between and operative position in which they extend on either side of the head (41) and a retracted position in which they are no longer positioned to the side of the head, so not impinging sideways motion of the head and/or access into or out of the vehicle. The restraint members (28) pivot between the two positions.

15 Claims, 6 Drawing Sheets

VEHICLE OCCUPANT HEAD PROTECTION

TECHNICAL FIELD

This invention relates to head protection in vehicles and more particularly protection of the head of a vehicle occupant when subject to sideways forces such as in a sideways collision or a rollover.

BACKGROUND ART

Head restraints mounted on the top of seats behind the heads of occupants have been common in passenger vehicles for some time. Whilst these restrain fore and aft movement of the occupant's head they provide little transverse restraint.

Head restraints with fixed portions that extend on either side of the head have been proposed but these make entering or exiting a vehicle difficult and more so after an accident when the occupant may be injured or unconscious.

DISCLOSURE OF THE INVENTION

In one broad form the invention provides a head restraint for a person sitting in a seat in a vehicle, the device including at least one head restraint member movable between retracted and operational positions, wherein in the operational position the at least one restraint member overlap a substantial part of at least one side of the head of the person and in the retracted position the at least one restraint member:
  overlaps less of the at least one side of the head of the person, or
  does not overlap the at least one side of the head of the person, or
  only overlaps an insubstantial part of the at least one side of the head of the person, and
wherein movement of the restraint members between the retracted and operational positions is associated with a seat belt provided for the seat.

The at least one restraint member may be moved from the retracted to the operational position by movement of one or more seat belts to an engaged position. Other means, such as electric motors, hydraulic or pneumatic actuators or the like may be used that are activated when the seat belt is buckled or unbuckled.

The at least one restraint member may be mounted on the vehicle or the seat of the person.

The at least one restraint member may move between the retracted and operational positions by rotation about one or more axes.

In one form the at least one restraint member may be two arms that extend either side of the person head. The two arms may be part of a U shaped member or may be separate. The invention may be used with a seat that has an extension on one side to limit sideways movement and as such may be implemented with only one movable restraint member.

Where the arms are part of a U shaped member the member is preferably rotated about an axis extending transversely of the person, preferably located behind the user. The transverse axis may be located near the floor of the vehicle of may be located adjacent to the head of the user. The axis may be connected to the vehicle or to the seat.

In one form there are two separate restraint members, each of which mounted on an axis of rotation. The axes of rotation may be coaxial or may be parallel to each other. In one form the two members rotate about separate and parallel axes that extend fore-aft relative to the person. Preferably the two members are interconnected so rotation of one member about its axis causes rotation of the other member about its axis.

The interconnection maybe by way of gears wheels but ropes, straps and the like may be used.

In one form the restraint member comprises a U shaped member having two restraint arms located on either side often head and mounted on at least one leg pivotably mounted on the vehicle or the seat itself about a transverse axis. One or more seatbelt straps pass from behind the seat through apertures in the at least one leg or the U shaped member and over the person's shoulders and torso. Protrusions mounted on the belts behind the apertures engage the apertures and pivot the at least one leg forward when the belts are drawn forward to be engaged and move the arms so as to overlie the sides of the user's head. The restraint member is biased to the retracted position so that when the seat belts are released the device pivots backwards.

In another form a conventional 3 point seat belt engages the restraint and rotates the member about a for-aft axis as the seat belt is extends end engaged.

In another broad form the invention also provides a head restraint system that limits forward movement for a person's head when wearing a crash helmet, the system including a tether assembly having ends connected on either lateral side of the helmet and extending over a pair of fixed and spaced apart first members and a movable second member located between the two first members, said second member movable so the path length of the tether from one first member via the second member to the other first member depends on the position of the second member, said first and second members arranged such that movement of the helmet in a forward direction requires movement of the second member so as to reduce the path length, said system including lock means to prevent movement of the second member when the vehicle is subject to a deceleration having a forward component exceeding a predetermined threshold.

The first and second members are preferably first and second rollers that rotate about a longitudinal axis. The second roller is preferably mounted on a slide or carriage that moves along a vertical path.

One or more locking pins are provided that are movable to lock the slide or carriage in a position. In one form an arm is provided that is movable under the action of a weight. When subject to deceleration having a forward component exceeding a predetermined threshold the weigh moves forward and moves the at least one pin to engage a respective locking bore.

Unless the context clearly requires otherwise, throughout the description and the claims the words 'comprise', 'comprising', and the like are to be construed in an inclusive sense as opposed to an exclusive or exhaustive sense; that is to say, in the sense of "including, but not limited to".

The invention shall be better understood from the following description of non-limiting examples.

BEST MODE OF CARRYING OUT THE INVENTION

Figure 1:
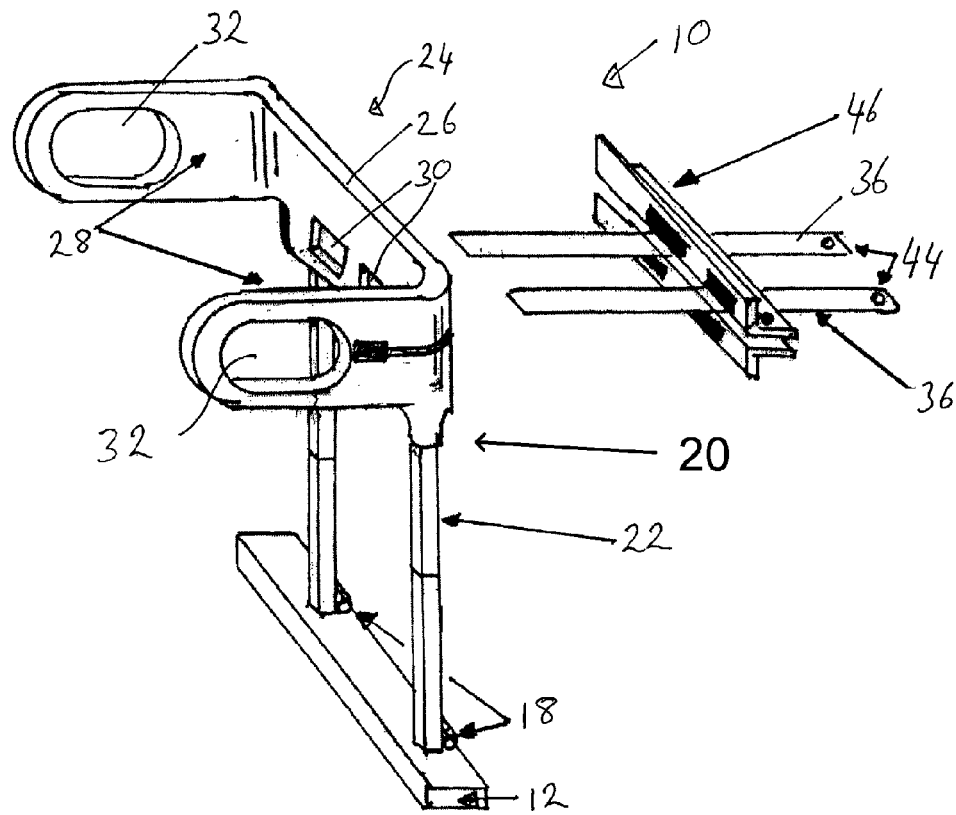
FIG. 1 is a perspective view of a first example of the invention.
Figure 2:
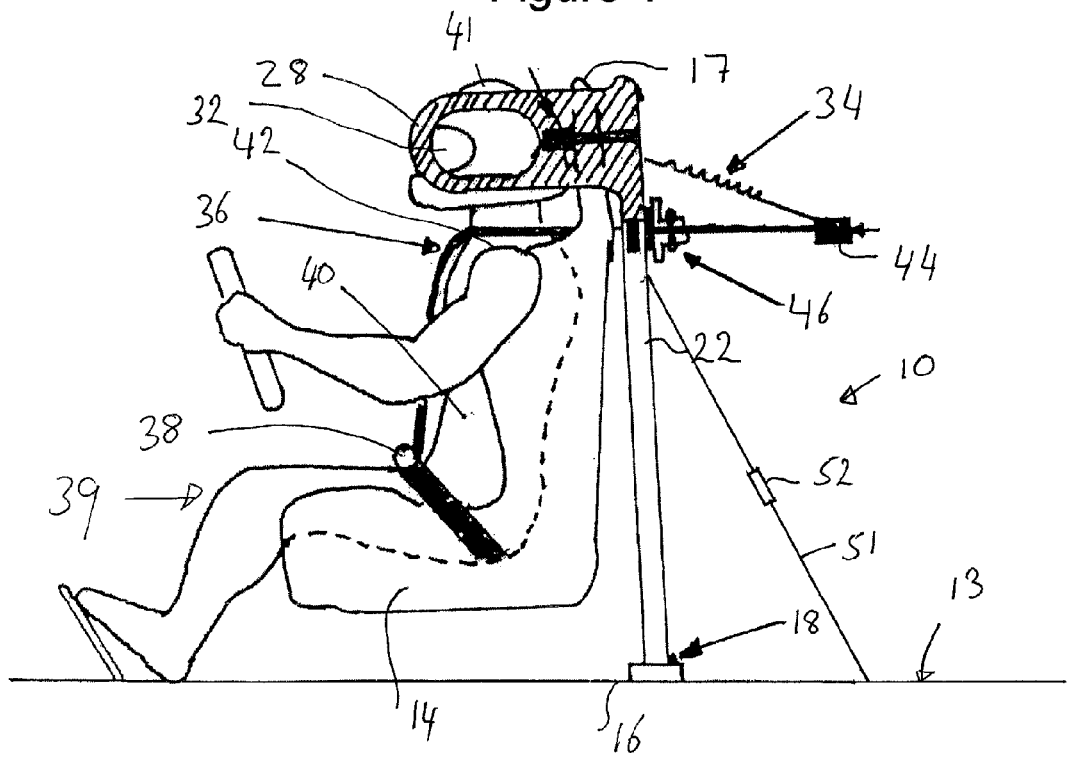
FIG. 2 is a side view of the first example in an operative position.
Figure 3:
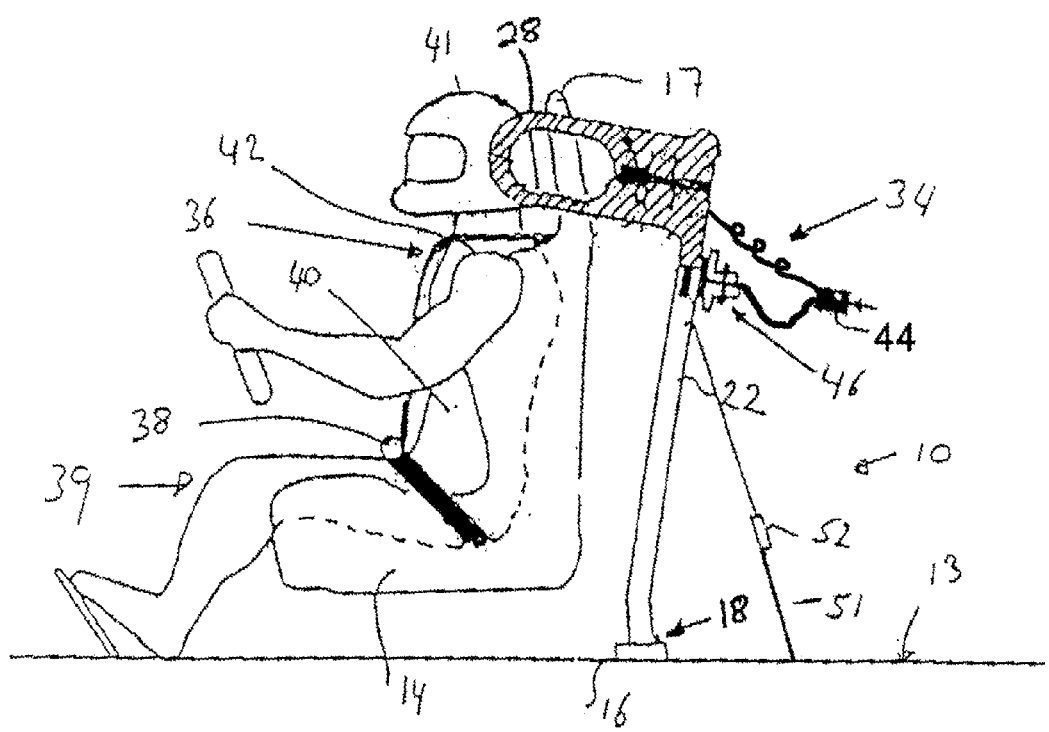
FIG. 3 is a side view of the first example in a retracted position.

Referring to FIGS. 1 to 3 there is shown a head restraint system generally indicated the numeral 10. The head restraint system 10 is generally independent of existing seats and may be retro-fitted to an existing vehicle. This example is mainly intended for use in racing cars and the like where a full safety harness is used as opposed to a three point type seatbelt found in most road going cars and trucks.

The system 10 comprises a base 12 that is to secured vehicle body 13 behind the seat 14 with which it will be used. In most situations the base 18 will be attached to the floor 16 but it may be attached to another part of the vehicle, such as a roll cage or the like or attached to or incorporated into the seat itself. Pivotably mounted on the base 12 via hinges 18 is a restraint assembly 20. The hinges may be mounted directly to part of the vehicle or seat as desired.

The assembly 20 comprises two telescopic legs 22 and a U shaped head restraint 24 mounted on the top of the legs 22. The height of the member 24 may be adjusted by adjusting the length of the legs 22.

The restraint 24 has a cross member 26 that extends transversely across the vehicle behind the seat 14 and two arms 28 that extend forwards from the cross member 26. The cross member 26 has apertures 30 whilst arms 28 have apertures 32.

The assembly is movable between a forward operative position, shown in FIG. 2 and a retracted position, shown in FIG. 3, in which it is rotated backwards so the arms 28 do not extend forwards as much as in the operative position. In the retracted position the arms 28 may overlap the head restraint portion 17 of the seat 14 slightly or may be fully retracted behind the seat 14. A spring 34 is connected between the assembly 20 and the car body 13. In the operative position the spring 34 is under tension and so biases the assembly 20 toward the retracted position.

A full safety harness includes two straps 36 that extend from a central latch 38, over the front of the torso 40 of the user 39 and then rearwards over the user's shoulders 42 through a respective one of the apertures 30 to fixed locations 44 on the vehicle body. Mounted on the straps behind the base 26 are two bars 46 that extend between the two straps 36 and are clamped to the straps 36. The bars 46 are fixed to the straps 36 and move with them.

Then the seat is unoccupied the seat belts 36 are loose and may be drawn backwards over the back of the seat 14. The spring 34 rotates the assembly 20 backwards. The bars 46 are in contact with the rear of the cross member 26 so as the assembly 20 pivots backwards the two seat belt straps 36 are drawn backwards. The weight of the bars 46 may also result in the straps becoming slack behind the assembly 20 with the bars 46 free of the assembly. This is not critical.

In the retracted position the arms 28 do not extend forward of the back of the seat or head restraint portion 17 as much and so the restriction on entry and exit from the seat 14 is less.

When user 39 occupies the seat 14 and pulls the two upper seatbelt straps 36 forward, they slide through the apertures 30 until the bars 46 contact the cross bar 26. Further forward movement of the straps 36 causes the assembly 20 to pivot forward about hinges 18 until the head restraining portion has rotated to the forward operative position shown in FIG. 2. The seat belts 36 may be attached to the other belts of the safety harness via buckle 38.

In this example the forward operative position is with the cross bar 26 pulled against the rear of the seat heat restraint portion 17 by the straps 36 and cross bars 46 and with the portion of the straps 36 between the bars 46 and the strap mounting points 44 firmly tensioned with no slackness. This is achieved by changing the position of the bars 46 on the straps 36 but may be achieved by other means, such as making the portion of the straps 36 between the bars 46 and the mounting points 44 length adjustable.

It is not critical that the cross bar be in contact against the back of the seat and other means of limiting forward rotation may be used. As an example, an optional tether 51 may extend between each leg 22 and the vehicle that limits forward rotation. A turnbuckle 52 provides for adjustment of the length of the or each tether 52.

Figure 4:
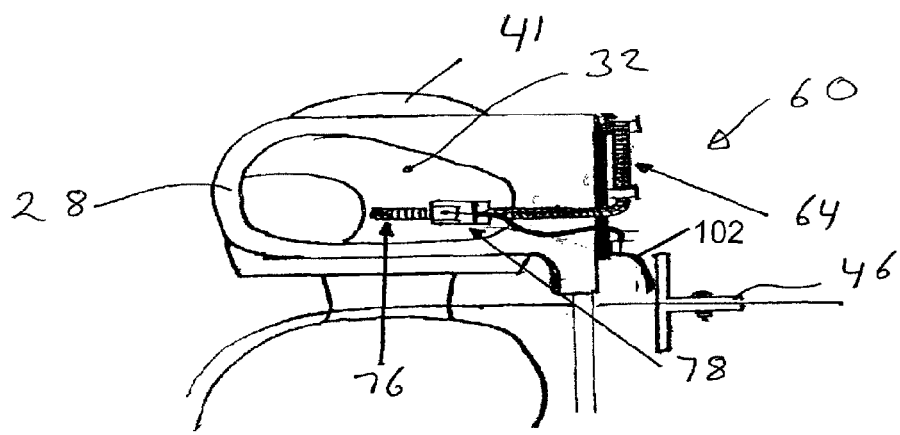
FIG. 4 is a side view of the arrangement of FIG. 5.

At this point the arms 28 extend alongside the sides of the user's head 41, as shown in FIG. 2. These are reasonably close to the head 41 (as seen in FIG. 4) and so will limit sideways movement of the head 41. The arms 28 may extend to the front of the user's head or helmet, as shown in FIG. 2, or beyond the front of the head or helmet. The arms do not need to extend fully to the front of the helmet or head. What is important is that they overlap a sufficient amount of the head or helmet such that they will significantly limit sideways movement of the head.

Although the arms 28 are close to the head 41 they are shaped and positioned so that the apertures 32 allow reasonable sideways visibility without the material of the arms 28 unduly restricting vision. Whilst it is desirable that sideways vision is restricted as less as possible, this is not critical. If desired solid arms 28 may be provided. Alternatively, if desired, the arms may be formed of a transparent material. Examples of such as transparent materials include Poly (methyl methacrylate) (PMMA), sold under the brand name of Perspex and polycarbonates or the like. If the transparent material is of suitable optical quality the apertures 32 may be omitted.

When it is time for the user 31 to leave the vehicle 13, the seatbelts 36 are released. The spring 34 rotates the assembly 20 backwards to the retracted position and also retracts the seat belts 36. The person may then exit the vehicle relatively unhindered by the arms 28. Although FIG. 3 shows the arms 28 overlapping the head of the user, this is at the rear of the head and does not significantly impede the person. If desired the assembly 20 may be rotated so that the front ends of the arms are either in line with the seat 14 or are behind the seat 14.

The use of the spring is not critical. If the assembly 20 has its centre of gravity behind the pivot point 18 it will fall backwards to the retracted position under gravity when the seat belts are released.

Whilst the drawings show two bars clamped to both seat belts it will be appreciated that it is merely necessary that each belt have a protrusion that will not pass through the aperture in the cross bar 26.

FIGS. 4 to 7 show the device of FIGS. 1 and 2 with an optional head restraint 60 that limits forward head movement. In many forms of car racing forward head restraints are compulsory. Existing forward head restraints have an assembly that is U shaped and fits over the shoulders of the wearer, with arms extending down the front and back of the wearer. The wearer's crash helmet has attachment points and tethers connect the helmet and assembly. In a crash the tethers prevent the head of the wearer moving forward. Whilst effective the assemblies are relatively uncomfortable and the tethers limit sideways rotation of the head.

Figure 5:
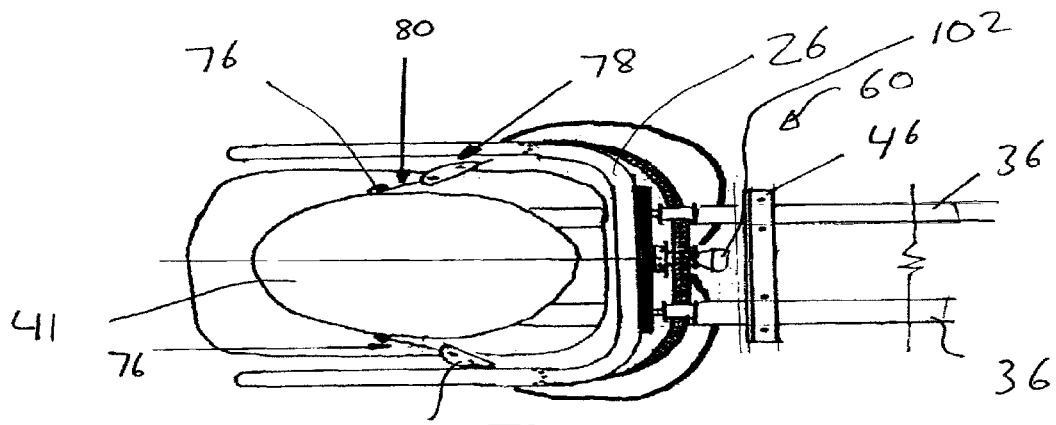
FIG. 5 is a plan view of the first example with an additional safety feature.

The example of FIGS. 3 to 5 has an optional forward head restraint generally indicated by 60. This may be attached to the rear of the cross member 26. The restraint 60 includes a vertical slide channel 62 mounted or formed in base plate 63. A carriage 66 is slideably mounted in the channel 62. The carriage 66 is biased upwards by one or more springs, schematically shown at 68. A central roller 70 is mounted on the carriage. Two side rollers 62 are mounted on the base plate 64 on either side of the channel 62 and lower than the carriage 66 in normal use.

A single tether 64 extends over the central roller 70 and under the side rollers 72. The user's helmet 41 has short straps 80 permanently attached at attachment points 76. The ends of the tether are connected to straps 80 via quick release clamps 78. The clamps 78 also allow the effective length of the tether 64 to be adjusted. By adjusting the length of the tether 64 the position of the carriage 66 in the channel 62 when the user's head or helmet 41 is back against the head restraint may be adjusted. The springs 68 urge the carriage upwards and so maintain the tether 64 under a small amount of tension.

When connected to the user's helmet 41, rotation or sideways leaning of the head merely results in the tether 64 sliding over the rollers 70, 72. The carriage 66 remains in a static position, movement is not restrained and there is relatively little additional effort required.

In normal use if the driver leans forward or tips their head forward both ends 74 of the tether 64 move forward and draw the carriage 66 downwards against force of the spring 68. The spring 68 is not intended to limit such movement or make it an effort and is provided so that when the head is moved backwards the carriage 66 rises, so maintaining the tether 64 in tension.

Figure 6:
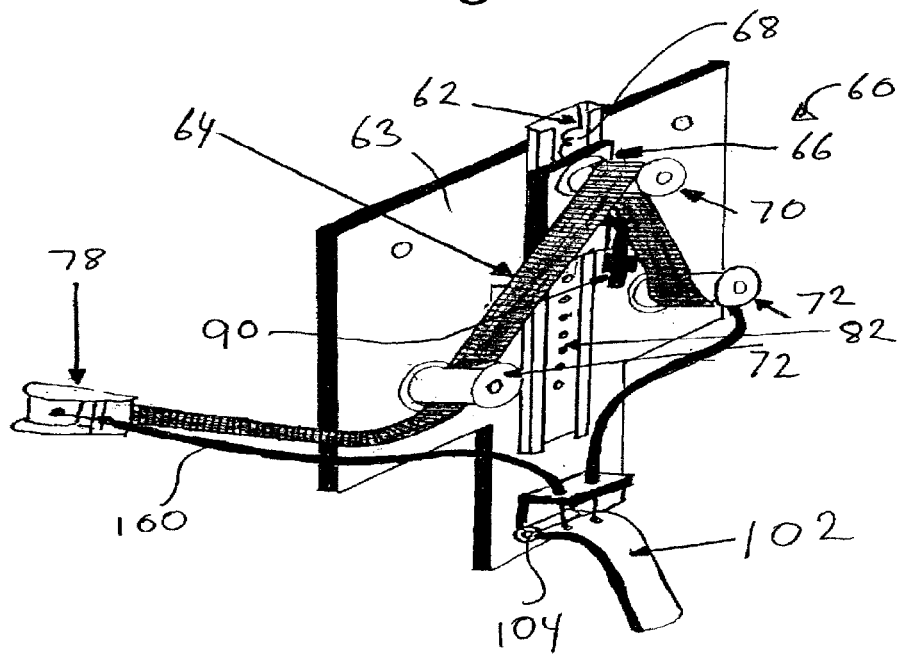
FIG. 6 is a perspective view from behind of part of the mechanism of the additional safety feature.
Figure 7:
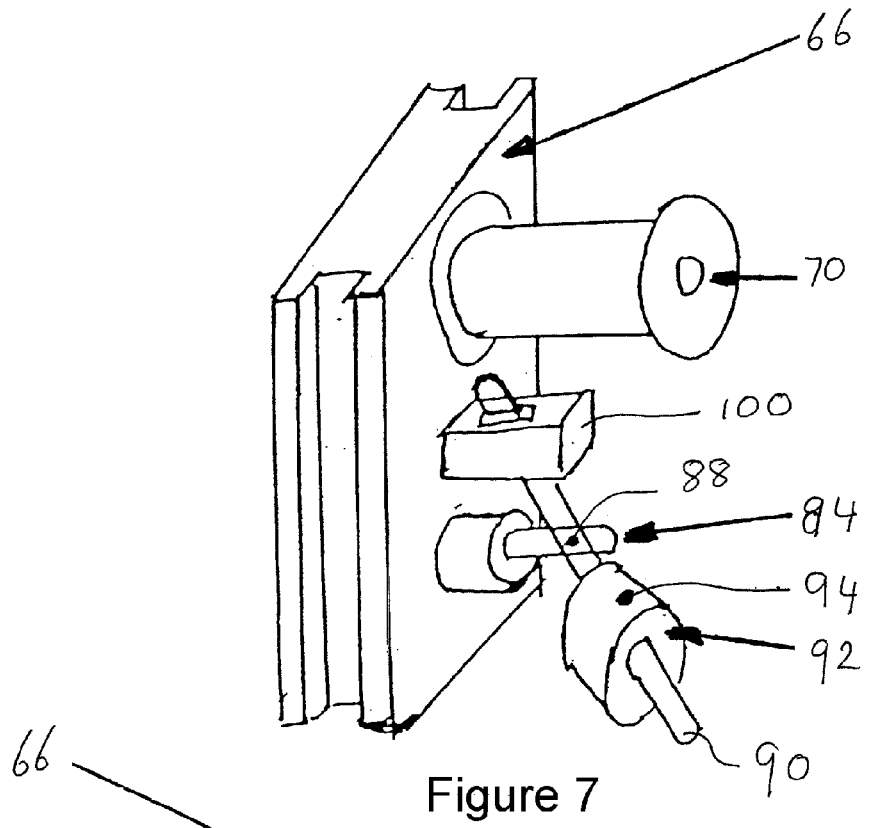
FIG. 7 is a perspective view from behind of some components of the mechanism of FIG. 6.
Figure 8:
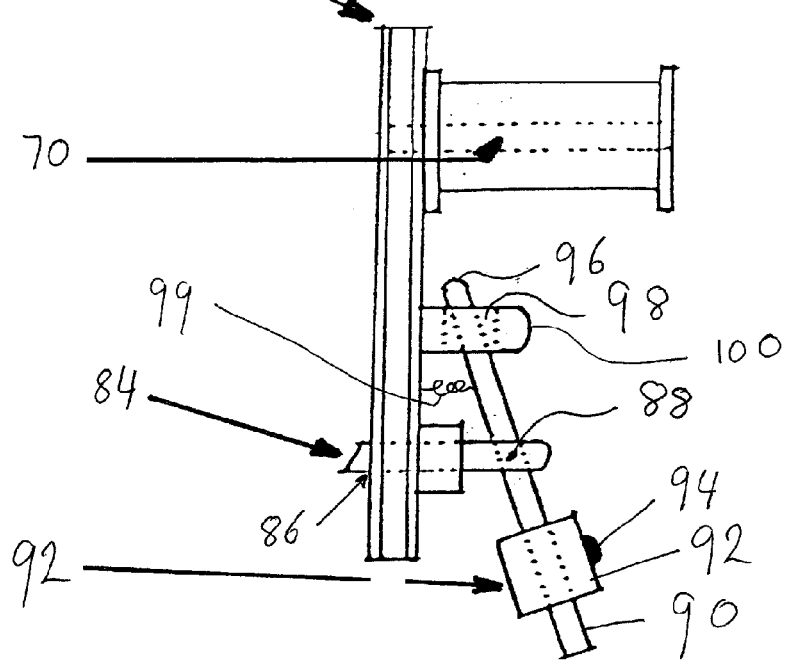
FIG. 8 is a side view of the components FIG. 7.

FIGS. 6 and 7 show a detail of the carriage 66. The channel 62 has a line of apertures 80. The carriage 66 carries a locking pin 84. The pin 84 is slideably mounted in a bore 86 in the carriage and aligns with the line of apertures 80. When the pin 84 is slid forward in the bore 86 and aligned with one of the apertures 80 it will enter the aperture 80 and prevent upwards or downwards motion of the carriage 66. When this occurs further forward motion of the head is prevented.

Pivotably mounted on the pin 84 at pivot point 88 is an activating lever 90. Mounted on the lever 90 below the pivot point 88 is a weight 92. The weight may slide along the lever 90 and may be locked against sliding by grub screw 94. If desired the weight 92 may be attached to the lever 90 in a fixed position or may be formed integrally with the lever 90. The upper end 96 of the lever 90 passes into, and preferably through, an aperture 98 in boss 100. The lever 90 is loose in the aperture 98 and so the aperture 98 acts as a loose pivot location. The lever 90 may be pivoted about this location, so causing the pin 84 to move forwards or backwards in bore 86.

In the event of forward collision both the head of the user and the weight 92 will move forward relative to the seat 13 and head restraint 60 due to inertia. Forward motion of the head and helmet 41 will tend to draw the carriage 66 downwards. Forward motion of the weight 92 will rotate lever 90 and drive the pin 84 forwards against the channel 62. When the carriage 66 moves downwards so the pin 84 is aligned with one of the apertures 80 the weight 92 will cause the pin 84 to enter the aperture 80 and prevent the carriage 66 moving downwards, so limiting forward motion of the head and transferring the inertial forces from the head to the head restraint via tether 64.

An optional spring 99 may be provided to prevent forward movement of the pin 84 under normal use and to retract the pin 84 after forward motion.

The device 60 also includes release wires 100 connected to clips 78. These wires 100 extend to release leaver 102 that is pivotably mounted on the base plate 63 via hinge 104. When the head restraint assembly 20 is in the operative position the cross bars 46 press on the release lever 102 and maintain it in a locked position. When the seat belts are released the lever 102 may be raised, which releases the clips 78 and releases the helmet from the tether 64.

FIGS. 9 to 13 schematically show a head restraint device 120 intended for use with a conventional three point seat belt found in most passenger cars. The device 120 is intended to be a replacement for existing head restraints mounted on the top of a seat. Most such head restraints are height adjustable by way of rods telescopically mounted in the top of the seat. Accordingly the device 120 has two such mounting rods 122 that support base plate 124 that extends transversely across the vehicle. This height adjustment is not critical to the working of the invention. Mounted on the base plate 124 are two head restraint members 126. Each member comprises a loop 128 pivotably mounted on the base about axes 130. Each head restraint member 126 includes gear wheel 132. The two gear wheels 132 engage each other so that the two head restraint members 126 are constrained to rotate about axes 132 together and cannot move independently of each other.

Figure 9:
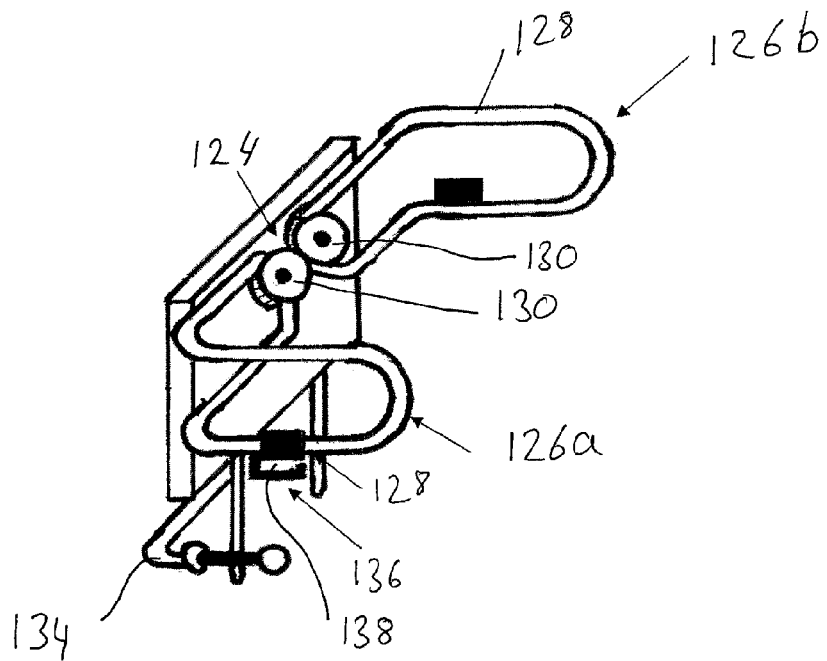
FIG. 9 is a perspective view of a second example of the invention in an extended position.
Figure 10:
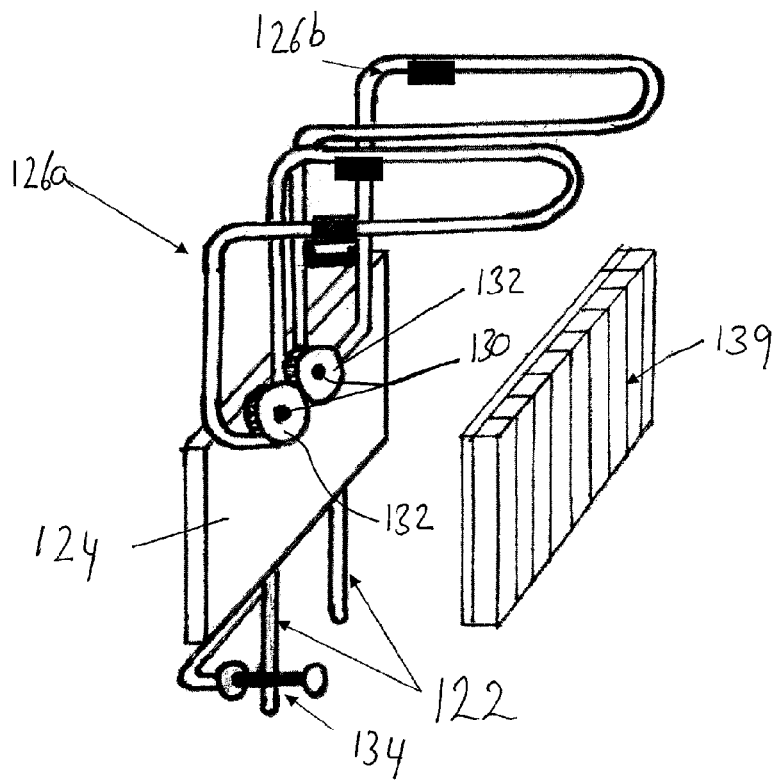
FIG. 10 is a perspective view of a second example in a retracted position.
Figure 11:
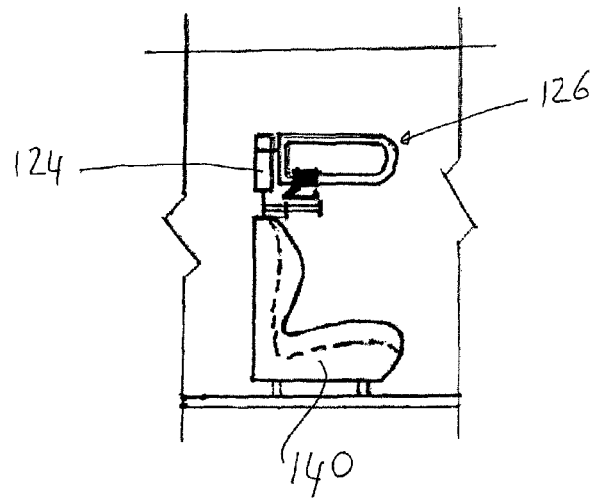
FIG. 11 is a side view of the second example.
Figure 12:
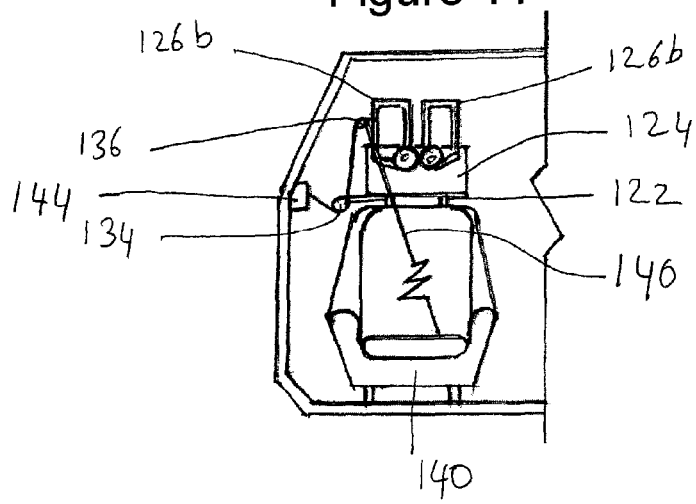
FIG. 12 is a front view of the second example in a retracted position.
Figure 13:
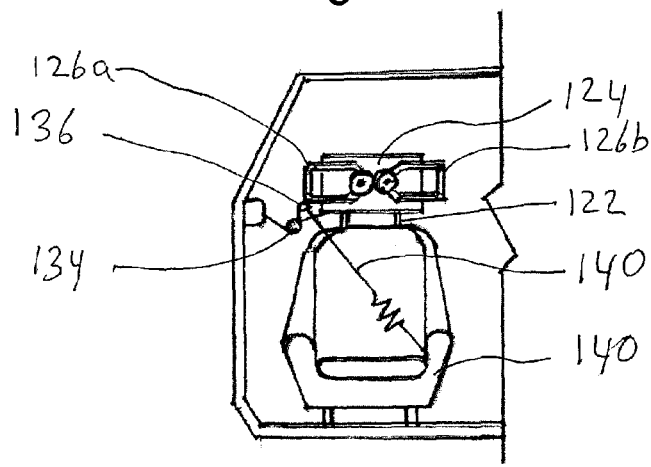
FIG. 13 is a front view of the second example in an extended position.

The head restraint members 126 may rotate between an operative position, shown in FIG. 9 and a retracted position, shown in FIG. 10. The head restraint members 126 are biased to the retracted position by one or more springs or weights (not shown).

Mounted on the base plate 124 is arm 134. The arm 134 is intended to be on the outside of the seat, near the associated seat belt. The adjacent head restraint members 126a has a horizontal slot member 136 mounted on the loop 128 with a slot 138. The slot is always above the arm 134, whether the head restraint members 126a is raised, as in FIG. 10 or lowered as in FIG. 9.

A cover 139 covers the base plate and provides padding and the like for the head a user of the seat.

In use the seat belt 140 associated with the seat 142 exits from housing 144 (which may be part of the seat, part of the vehicle of just mounted in the vehicle. The seat belt 140 passes underneath the arm 134 and then through the slot 138. The other end of the seat belt (not shown) is attached to the vehicle or seat on the same side as the housing.

When not in use the seat belt has relatively low tension and the biasing force applied to the head restraint members 126 overcomes this tension and maintains the head restraint members 126 in the upwards rotation. In this position the head restraint members 126 are located above the volume that a user of the seat would occupy and are not located to the side of this volume. Thus entry or exit from the vehicle is not impeded significantly, if at all.

When a user occupies the seat and uses the seatbelt, more belt is withdrawn from the housing. Seat belts are stored on a sprung drum, with the tension increasing as more belt is withdrawn. This increase in tension overcomes the biasing of the head restraint members 126 and they are rotated downwards to the position shown in FIGS. 9 and 13.

The loops 128 overlap the sides of the head of the user and so limit sideways motion of the head. The loops 128 do not significantly impinge on the user's sideways vision. As with the first example, the head restraint members 126 may be formed of transparent and/or solid material rather than of opaque loops.

When the user releases the seat belt 140, the seat belt retraction mechanism withdraws the seat belt. When the tension in the seat belt 140 is low enough the head restraint members 126 are automatically rotated upwards and no longer restrict sideways access.

Whilst the head restraint members 126 of the second example rotate about separate axes that extend fore-aft, the head restraint members may be mounted on a single axis or about a transverse axis behind the user's head, so that they rotate between a generally vertical position, in which they are substantially behind the users head and a generally horizontal position in which they extend forward and extend alongside the user's head.

Whilst the examples shown and descried utilise the seatbelts to be connected to the restraint devises to move the devices from retracted to extended, operative positions, other means of movement may be utilized. Electric motors may rotate the head restraint members 126 of the second example, these being activated when the seatbelt is engaged or disengaged from the relevant buckle. The head restraint members 126 may be biased to the retracted position and only require the motor(s) to move them to the operative position. Similarly the assembly 120 of the first example may be rotated by an electrical or mechanical actuator.

The invention may be use with a seat that has an extension on one side to limit sideways movement and as such may be implemented with only one movable restraint member.

It will be apparent to those skilled in the art that many obvious modifications and variations may be made to the examples described herein without departing from the spirit or scope of the invention.

INDUSTRIAL APPLICABILITY

The invention has industrial applicability to vehicles and occupant safety.

The invention claimed is:

1. A head restraint system for a person sitting in a seat in a vehicle, the system including at least one head restraint member mounted for rotation about at least one first axis between retracted and operational positions, wherein in the operational position the at least one restraint member is adapted to overlap a substantial part of at least one side of the head of the person and wherein in the retracted position the at least one restraint member is adapted to:
   overlap less of the at least one side of the head of the person, or
   overlap none of the at least one side of the head of the person, or
   overlap only an insubstantial part of the at least one side of the head of the person, and
wherein movement of the at least one restraint member between the retracted and operational positions is associated with a seat belt provided for the seat.

2. The head restraint system of claim 1 wherein at least one seat belt strap engages a part of the head restraint and movement of said at least one seat belt strap to an engaged position moves the at least one restraint member from the retracted to the operational position.

3. The head restraint system of claim 1 having two restraint members adapted to extend on either side of the head in the operative position.

4. The head restraint system of claim 3 wherein the two restraint members are the arms of a U shaped member.

5. The head restraint system of claim 4 wherein the U shaped member is adapted to rotate about the at least one first axis, and wherein said at least one first axis is a single axis extending transversely of the person.

6. The head restraint system of claim 1 wherein at least one seatbelt strap passes from behind the seat through at least one aperture in a part of said system, said at least one seatbelt strap including protrusions mounted on the belts behind the at least one aperture that engage the at least one aperture and pivot the at least one restraint member forward to the operative position when the at least one seatbelt strap is drawn forward to be engaged and move the restraint.

7. The head restraint system of claim 1 including a tether assembly having ends connected on either lateral side of the helmet and extending over a pair of fixed and spaced apart first members and a movable second member located between the two first members, said second member movable so the path length of the tether from one first member via the second member to the other first member depends on the position of the second member, said first and second members arranged such that movement of the helmet in a forward direction requires movement of the second member so as to reduce the path length.

8. The head restraint system of claim 7 including a locking mechanism movable to an operative position to prevent movement of the second member when the vehicle is subject to a deceleration having a forward component exceeding a predetermined threshold.

9. The head restraint system of claim 8 wherein said locking mechanism includes at least one locking pin, movable to lock the slide or carriage in a position.

10. The head restraint system of claim 9 wherein said locking mechanism includes an arm connected to the pin, movable under the action of a weight.

11. The head restraint system of claim 7 wherein the first and second members are first and second rollers each adapted to rotate about a respective second axis extending longitudinally of the person.

12. The head restraint system of claim 11 wherein the second roller is mounted on a slide or carriage that moves along a vertical path relative to the first rollers.

13. The head restraint system of claim 1 including two separate restraint members, each of which is mounted on a respective first axis of rotation.

14. The head restraint system of claim 13 wherein the two restraint members are interconnected so rotation of one member about its first axis causes rotation of the other member about its first axis.

15. The head restraint system of claim 13 wherein at least one seatbelt strap engages a first one of the two restraint members and rotates the first one of the two restraint members about a fore-aft first axis as the seat belt is extended and engaged.

* * * * *